Patented Dec. 2, 1941

2,264,927

UNITED STATES PATENT OFFICE 2,264,927

AN ESTER OF AN AROMATIC SULPHODICARBOXYLIC ACID OF THE BENZENE SERIES AND A PROCESS OF MAKING SAME

Otto Albrecht, Neuewelt, Muenchenstein, Switzerland, assignor to Society of Chemical Industry in Basle, Basel, Switzerland No Drawing. Application March 19, 1940, Serial No. 324,880. In Switzerland April 4, 1939

10 Claims. (Cl. 260—470)

According to this invention, new esters of aromatic sulphodicarboxylic acids of the benzene series are made by the esterification or reaction of a member selected from the group of compounds consisting of 4-sulphophthalic acid, its salts, substitution products, anhydride, and halides with at least one mol of 2-ethyl-butanol.

Should one mol only of 2-ethyl-butanol be allowed to react on one mol of the aromatic sulphodicarboxylic acid of the benzene series mentioned, or on one mol of its derivative, a carboxylic acid mono-ester of the aromatic sulphodicarboxylic acid results. If at least 2 mols of 2-ethyl-butanol are allowed to react, sulphodicarboxylic acid esters are obtained in which both carboxyl groups are esterified. In addition, esters of 4-sulphophthalic acid and their substitution products of the type described in the present invention may also be obtained if one carboxyl group of the 4-sulphophthalic acid or of its substitution products is esterified with 2-ethyl-butanol and the other carboxyl group is esterified with an alcohol which contains at least 4 carbon atoms.

As substitution product of 4-sulphophthalic acid, for example 4-sulpho-5-chloro-phthalic acid may be used. As functional derivatives, the carboxylic acid anhydrides, carboxylic acid halides and carboxylic acid esters, such as 4-sulphophthalic acid anhydride or 4-sulphophthalic acid trichloride, come into consideration. The carboxylic acid esters of 4-sulphophthalic acid with low molecular aliphatic alcohols, for example, the mono-alkali salts of 4-sulphophthalic acid dimethyl ester, are preferably used as parent substances in the interchanging of ester radicals.

As alcohols which have more than 4 carbon atoms the following may come into consideration, for example: butyl, isobutyl, amyl, n-hexyl alcohol, 2-ethyl-butanol-(1), methyl-propylcarbin-carbinol, 2-ethylhexanol-(1), decyl, dodecyl, hexadecyl, octadecyl alcohol, and methylcyclohexanol.

Esterification may take place by heating the free sulpho-acids or their salts with the alcohol. If the free sulpho-acid be used, heating takes place preferably at about 50–120° C. Should the sulpho-acids in the form of their salts be used, a higher reaction temperature may be chosen, in which case it is often preferabe to add a small quantity of an accelerator, such as hydrochloric acid gas or concentrated sulphuric acid, to the esterification mixture. The esterification is assisted if the water formed in the course of the reaction is removed from the esterification mixture by known methods, for example by the aid of substances which, like benzene and toluene, form azeotropic mixtures with water. In such circumstances, the azeotropic mixture of water and solvent may be distilled away, or the returning condensate may be led off in known manner into an intermediate container, which permits of the continuous removal of the water of reaction. It may also be preferable to carry out the esterification under diminished pressure, whether or not the reaction be carried out with the aid of a solvent. The interchange of ester radicals of sulpho-acid salts of 4-sulphophthalic acid esterified with low molecular alcohols is carried out advantageously in the presence of alkaline catalysts, such as alkali alcoholates.

The esters which are derived from 4-sulphophthalic acid or from its substitution products contain on the one hand the residues of the aromatic sulpho-dicarboxylic acids used and, on the other hand, at least one residue adhering to a carboxyl group of the formula

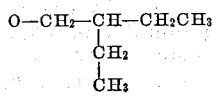

The other carboxyl groups of the above mentioned aromatic sulphodicarboxylic acids may be united with a group of the general formula O—R, wherein R means the residue of hydrocarbon containing at least 4 carbon atoms. The esters of the aromatic sulpho-dicarboxylic acids obtainable by the process of the present invention constitute in the form of their dried alkali salt, colourless to light coloured substances which dissolve in water to form capillary active solutions.

The esters of aromatic sulpho-dicarboxylic acids obtainable according to the present process and their salts with mono- or polyvalent metals, ammonia or amines are, in general soluble in water and may find use as textile auxiliary products, for example, as wetting-out, cleansing, emulsifying and levelling agents and the like.

In contrast to the esters of 4-sulphophthalic acid already described, the products of the present invention are characterised in general by their higher wetting activity.

The products of the present invention may be used either alone or in combination with other materials, such as salts, also together with solvents or substances which improve solubility, such as ureas, sodium cymolsulphonate, furthermore with soaps, soap-like substances, protective colloids, finishing materials weighting, softening or dulling agents, etc. For example, preparations may be prepared from the new products, in mixtures with fat solvents, such as pine oil, methylcyclohexanol, tetrahydronaphthalene, which are notable for their extraordinary wetting action.

The following examples illustrate the invention.

*Example 1*

Phthalic acid anhydride is sulphonated in known manner by heating the sulphur trioxide, and the sulphonation mass is then freed as far as possible from the excess of sulphonating agent. 123 parts by weight of the sulphonation product of phthalic acid anhydride thus obtained, containing about 7.3% of sulphuric acid, are heated to about 55° C. and 65 parts by weight of 2-ethyl-hexanol are added with stirring during 2 hours, the temperature being kept at 55–60° C. Care must be taken that the esterification mass, which at first is very tough, is thoroughly mixed with the alcohol. Stirring is continued for a further 15 minutes at 55–60° C., and 76.5 parts by weight of 2-ethyl-butanol, as well as 120 parts by volume of benzene are run in, the temperature of the heating bath is raised to 80–85° C., and the pressure is diminished to such an extent that the mixture boils gently. The condensate from the reflux condenser is preferably passed through a water trap, constructed in known manner, from which the water of reaction may be drawn off, while the benzene is allowed to flow back into the esterifying vessel. Heating is continued until no more water is split off, which usually requires a period of 4–6 hours. After this time, about 10 parts by volume of water have collected in the water trap. The esterification mixture is now allowed to cool down to about 35° C. and it is then neutralised with about 30 parts by weight of finely-powdered calcined soda, stirring being continued. After the neutralised product has been stirred for about 10 minutes at 60° C., the volatile portions are removed with the aid of steam, it being preferable to introduce the steam as rapidly as possible in order to avoid unnecessary frothing. The viscous solution thus obtained is evaporated to dryness, preferably under diminished pressure.

The new product, the main constituent of which probably possesses the formula

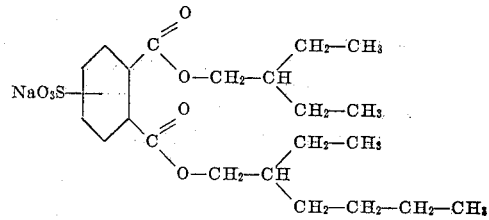

is a solid, almost colorless mass, which dissolves in water to yield a foaming solution of outstanding wetting powers. The high wetting powers of the product are exhibited in both soft and hard waters. The admixture of calcined Glauber's salt is advantageous when the product is to be used as a wetting agent.

In similar manner other mixed esters of 4-sulphophthalic acid may be obtained by replacing the 2-ethyl-hexanol, for example, by the equivalent quantity of amyl or n-octyl-alcohol.

*Example 2*

46 parts by weight of 2-ethyl-butanol-(1) are allowed to run slowly into 34.2 parts by weight of 4-sulphophthalic acid anhydride over a period of about ¾ hour, the temperature being maintained at 60–65° C., and care being taken that the esterification mass, which is at first viscous, is thoroughly mixed. After the addition of 30 parts by volume of benzene, heating is carried out in the manner described in Example 1 in a boiling water bath with diminished pressure until about 3.4 parts by volume of water have been split off, a process which is complete in about 2 hours. After cooling, the esterification mixture is diluted with water, neutralised with sodium hydroxide and evaporated to dryness, preferably under diminished pressure. The new ester thus obtained, which probably possesses the formula

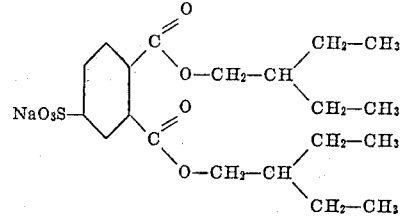

is a solid mass, aqueous solutions of which, particularly when prepared with hard water, possess very good wetting powers.

A mono-ester of 4-sulphophthalic acid is obtained if only 1 mol of 2-ethyl-butanol-(1)—instead of an excess—be allowed to react at about 60° C.

*Example 3*

46 parts by weight of 2-ethyl-butanol-(1) are allowed to run into 34.2 parts by weight of 4-sulphophthalic acid anhydride over a period of about ¾ hour, the temperature being maintained at 55–60° C. Care must be taken that the esterification mixture, which is at first viscous, is thoroughly mixed. After the addition of 43 parts by volume of benzene, heating is carried out in a manner similar to that adopted in Example 1 in a bath at 80–85° C., until no more water is split off, which usually requires about 3½ hours, after which time about 2.4 parts by volume of water have been separated in the water trap. The esterification mixture is worked up as described in Example 2, resulting in a product which possesses similar properties but which wets-out rather better when used in hard water, for example, in water of 20° hardness on the German scale.

What I claim is:

1. Process for the manufacture of esters of aromatic sulphodicarboxylic acids of the benzene series, comprising causing a member selected from the group of compounds consisting of the 4-sulphophthalic acid, its salts, halogen substitution products, anhydride and halides, to react with at least one mol of 2-ethyl-butanol.

2. Process for the manufacture of esters of aromatic sulphodicarboxylic acids of the benzene series, comprising causing a member selected from the group of compounds consisting of the 4-sulphophthalic acid, its salts, halogen substitution products, anhydride and halides, to react with one mol of 2-ethyl-butanol, and at least one mol of an alcohol containing at least 4 carbon atoms.

3. Process for the manufacture of esters of aromatic sulphodicarboxylic acids of the benzene series, comprising causing a member selected from the group of compounds consisting of the 4-sulphophthalic acid, its salts, halogen substitution products, anhydride and halides, to react with one mol of 2-ethyl-butanol, and at least one mol of an aliphatic alcohol containing 8 carbon atoms.

4. Process for the manufacture of esters of aromatic sulphodicarboxylic acids of the benzene series, comprising causing a member selected from the group of compounds consisting of the 4-sulphophthalic acid, its salts, halogen substitution products, anhydride and halides, to react with at least two mols of 2-ethyl-butanol.

5. Process for the manufacture of esters of aromatic sulphodicarboxylic acids of the benzene series, comprising causing a member selected from the group of compounds consisting of the 4-sulphophthalic acid, its salts, halogen substitution products, anhydride and halides, to react with one mol of 2-ethyl-butanol and at least one mol of 2-ethyl-hexanol.

6. An ester of the 4-sulphophthalic acid in which, at least one carboxyl group is esterified with the alcohol of the formula

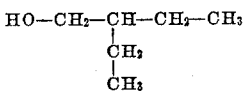

which products, in the form of their dried alkali salts, constitute colorless to light-colored substances which dissolve in water to form capillary active solutions.

7. An ester of the 4-sulphophthalic acid in which one carboxyl group is esterified with the alcohol of the formula

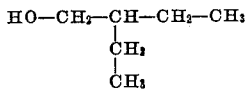

and in which the other carboxylic group is esterified with the alcohol of the general formula HO—R wherein R means the radical of an hydrocarbon containing at least 4 carbon atoms, which products, in the form of their dried alkali salts, constitute colorless to light colored substances which dissolve in water to form capillary active solutions.

8. An ester of the 4-sulphophthalic acid, in which one carboxyl group is esterified with the alcohol of the formula

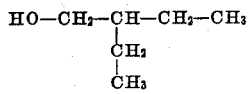

and in which the other carboxylic group of the general formula HO—R wherein R means the radical of an aliphatic hydrocarbon containing 8 carbon atoms.

9. An ester of the 4-sulphophthalic acid of the formula

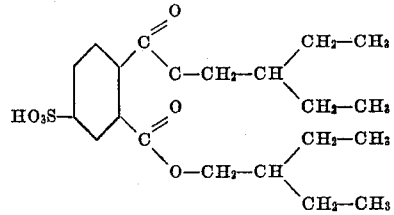

which product in the form of its dried alkali salts, constitutes colorless to light-colored substances which dissolve in water to form capillary active solutions.

10. An ester of the 4-sulphophthalic acid, in which one carboxyl group is esterified with the alcohol of the formula

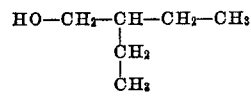

and in which the other carboxyl group of the formula

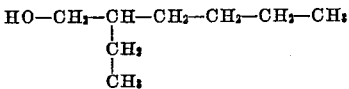

which products, in the form of their dried alkali salts, constitute colorless to light-colored substances which dissolve in water to form capillary active solutions.

OTTO ALBRECHT.